United States Patent
Panneerselvam et al.

(10) Patent No.: US 9,972,321 B2
(45) Date of Patent: May 15, 2018

(54) VOICE INTERFACES IN PROCESS CONTROL SYSTEMS

(71) Applicant: Bristol, Inc., Houston, TX (US)

(72) Inventors: Ranjithkumar Panneerselvam, Thiruvannamalai (IN); Scott Gregory Szurek, Bondurant, IA (US); Tyler Scott Stapler, Ames, IA (US)

(73) Assignee: Bristol, Inc., Houston, TX (US)

( * ) Notice: Subject to any disclaimer, the term of this patent is extended or adjusted under 35 U.S.C. 154(b) by 43 days.

(21) Appl. No.: 15/070,740

(22) Filed: Mar. 15, 2016

(65) Prior Publication Data

US 2017/0213558 A1 Jul. 27, 2017

(30) Foreign Application Priority Data

Jan. 27, 2016 (IN) .............................. 201621002963

(51) Int. Cl.
*G10L 21/00* (2013.01)
*G10L 17/06* (2013.01)
*G05B 19/042* (2006.01)
*G10L 15/22* (2006.01)
(Continued)

(52) U.S. Cl.
CPC .......... *G10L 17/06* (2013.01); *G05B 19/0426* (2013.01); *G05B 2219/23386* (2013.01);
(Continued)

(58) Field of Classification Search
CPC ........ G05B 2219/36159; G05B 19/042; G05B 19/409; G05B 2219/34481; G05B 19/0426; G05B 19/4065; G05B 19/4184; G05B 2219/23161; G05B 2219/24028; G05B 2219/25062; G05B 2219/25428; G05B 2219/31334; G05B 2219/45057; G05B 9/02; G06F 3/167; G06F 3/04842; G06F 2221/2133; G06F 21/34; G06F 21/32;
(Continued)

(56) References Cited

U.S. PATENT DOCUMENTS 5,598,572 A * 1/1997 Tanikoshi ............ G05B 19/042
342/450
7,316,354 B2 * 1/2008 Davis ...................... G06Q 10/08
235/385

(Continued)

FOREIGN PATENT DOCUMENTS

EP 2801972 11/2014
GB 2422234 7/2006

OTHER PUBLICATIONS

International Searching Authority, "Invitation to Pay Additional Fees and, Where Applicable, Protest Fee", issued in connection with international application No. PCT/US2017/014860, dated Apr. 21, 2017 (11 pages).

*Primary Examiner* — Vijay B Chawan
(74) *Attorney, Agent, or Firm* — Hanley, Flight and Zimmerman, LLC

(57) ABSTRACT

Voice interfaces in process control systems are disclosed herein. One disclosed example method includes authenticating an RFID device, and, based on authenticating the RFID device, receiving voice instructions, where the voice instructions include settings data for a process control device of a process control system. The example method also includes determining, using a processor, the settings data based on the voice instructions, and storing the settings data.

24 Claims, 11 Drawing Sheets

(51) Int. Cl.
*H04W 12/06* (2009.01)
*G06K 7/10* (2006.01)

(52) U.S. Cl.
CPC .............. *G05B 2219/25428* (2013.01); *G06K 7/10366* (2013.01); *G10L 2015/223* (2013.01); *H04W 12/06* (2013.01); *Y02P 90/02* (2015.11)

(58) Field of Classification Search
CPC .... G06F 21/31; G06F 17/3012; G06F 17/243; H04M 3/42255; H04M 7/0024; H04M 7/006; H04M 2203/655; H04M 2203/1091; G10L 17/005; G10L 17/22; G10L 15/265; G10L 17/26; G10L 13/043; G10L 13/033; G10L 15/22; G10L 15/08; G10L 15/063; G10L 17/02; G10L 17/06; G10L 15/07
USPC ....... 704/275, 251, 206, 270, 235, 246, 260, 704/273; 379/88.17, 88.22, 67.1, 93.03, 379/207.13; 455/414.1, 414.2, 456.3; 235/385, 462.01; 709/206; 434/188
See application file for complete search history.

(56) References Cited

U.S. PATENT DOCUMENTS

| | | | |
|---|---|---|---|
| 2002/0171558 A1* | 11/2002 | Bartelheim | G05B 19/042 340/8.1 |
| 2003/0122652 A1 | 7/2003 | Himmelstein | |
| 2003/0204373 A1* | 10/2003 | Zielinski | G05B 9/02 702/184 |
| 2003/0229472 A1* | 12/2003 | Kantzes | G05B 19/4065 702/183 |
| 2004/0034448 A1* | 2/2004 | Siegers | G05B 19/4184 700/245 |
| 2006/0178947 A1* | 8/2006 | Zsigmond | B07C 5/34 705/26.1 |
| 2007/0153771 A1* | 7/2007 | Doradla | H04L 12/66 370/352 |
| 2011/0207439 A1* | 8/2011 | Ross | H04M 7/0024 455/414.1 |
| 2016/0062971 A1* | 3/2016 | Thakker | G06F 21/32 715/780 |
| 2017/0010062 A1* | 1/2017 | Black | F41A 17/063 |

* cited by examiner

VOICE INTERFACES IN PROCESS CONTROL SYSTEMS

RELATED APPLICATIONS

This patent claims priority to Indian Patent Application No. IN201621002963, entitled "Voice Interfaces in Process Control Systems," which was filed on Jan. 27, 2016. The foregoing Indian Patent Application is hereby incorporated herein by reference in its entirety.

FIELD OF THE DISCLOSURE

This disclosure relates generally to voice interfaces and, more particularly, to voice interfaces in process control systems.

BACKGROUND

Process control systems, like those used in chemical, petroleum or other processes, typically include one or more process controllers communicatively coupled to one or more field devices via analog, digital or combined analog/digital buses. The field devices, which may be, for example, instruments, flow computers, valve positioners, switches and transmitters (e.g., temperature, pressure and flow rate sensors), perform process control functions within the process such as opening or closing valves and measuring process control parameters. The process controllers receive signals indicative of process measurements made by the field devices and then process this information to generate control signals to implement control routines, to make other process control decisions, and to initiate process control system alarms.

Programming, configuring or obtaining information from the field devices and/or the controller is usually accomplished over a data highway or communication network to one or more other devices or systems, such as operator work stations, personal computers, data historians, report generators, centralized databases, etc. Such devices or systems are typically located in control rooms and/or other locations remotely situated relative to the harsher plant environment. These devices or systems, for example, run applications that enable an operator to perform any of a variety of functions with respect to the process implemented by a process control system, such as viewing the current state of a process, changing an operating state, changing settings of a process control routine, modifying the operation of the process controllers and/or the field devices, viewing alarms generated by field devices and/or process controllers, simulating the operation of the process for the purpose of training personnel and/or evaluating the process, etc.

In some examples, field devices must be programmed locally (e.g., due to plant configuration and/or security measures) and, thus, the operator must access programming terminals and/or the field devices to configure (e.g., set parameter values) the field devices. In current systems, configuring these devices or systems may require a time consuming process where only a single process control device interfaces may interface with a laptop or a portable device at a time. Further, some field devices may also be enclosed within explosion proof boundaries and, thus, these field devices may require programming interfaces that do not have wired programming interfaces, but must still be secure.

SUMMARY

An example method includes authenticating an RFID device and, based on authenticating the RFID device, receiving voice instructions, where the voice instructions include settings data for a process control device of a process control system. The example method also includes determining, using a processor, the settings data based on the voice instructions, and storing the settings data.

Another example method includes receiving a voice statement via a microphone, authenticating, via a processor, the voice statement based on a comparison of the voice statement to a pre-recorded voice sample. The example method also includes, upon successfully authenticating the voice instruction, enabling a transfer of data between the terminal of the process control system and a portable device.

An example apparatus includes a programming authentication system for a process control system. The example programming authentication system includes a microphone, a processor including a voice analyzer to analyze a voice statement received at the microphone, and an RFST to communicate with one or more of a device tag or a portable device to program a process control device of the process control system.

Yet another example method includes detecting a portable device, and setting a terminal of a process control system to a programming mode based on the detection of the portable device. The example method also includes receiving a voice statement, at one or more of the terminal or an RFST device, when the terminal is set to the programming mode, and authenticating the voice statement. The example method also includes, upon successfully authenticating the voice statement, analyzing the voice statement to store configuration settings based on an analysis of the voice statement.

An example method to program a process control device includes detecting an authentication device including an NFC or RFID interface, authenticating the authentication device, and upon successfully authenticating the authentication device, identifying a programming device approved for programming the process control device. The example method also includes determining whether the identified programming device is communicatively coupled to a network that is communicatively coupled to the process control device. The example method also includes upon successfully determining that the identified programming device is communicatively coupled to the network, receiving configuration settings from the portable device and programming the process control device based on the configuration settings.

BRIEF DESCRIPTION OF THE DRAWINGS

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts.

DETAILED DESCRIPTION

Figure 1:
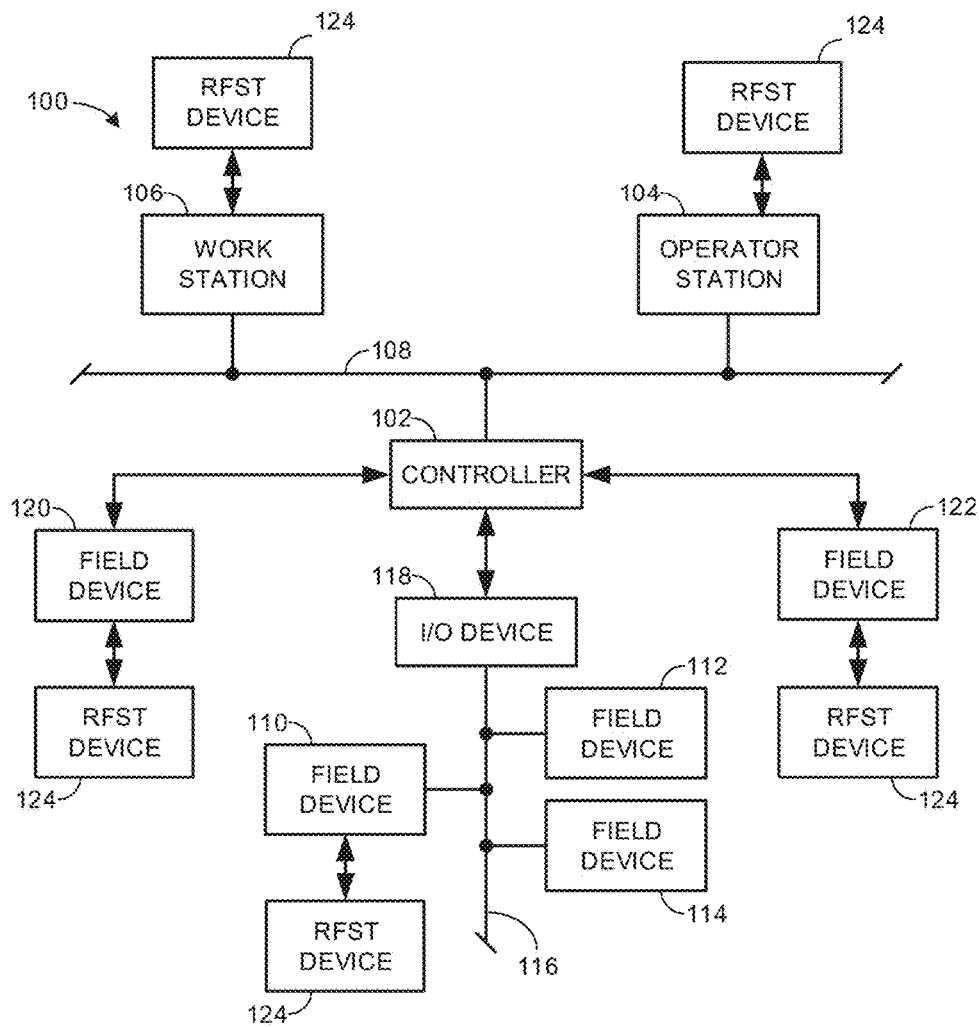
FIG. 1 is a schematic illustration of an example process control system within which the teachings of this disclosure may be implemented.

Voice interfaces in process control systems are disclosed herein. Typically, process control systems have numerous process control devices (e.g., field devices), in which configuration settings are defined/set. In typical process control systems, process control devices such as field devices, work stations and/or operator stations associated with the process control system must be accessed (e.g., securely accessed) to change/modify/define configuration settings. Accessing these devices may be expensive, tedious and/or time consuming because of the security measures necessary and/or programming equipment needed for programming of the devices.

While field devices located throughout a process control system may be programmed from a central, remotely located control room, there are circumstances where operators, engineers, and/or other plant personnel are located in the field near the field devices such as, for example, during the configuration and/or set-up of field devices and/or other control elements within a process plant. When field devices and/or final control elements require set-up (e.g., setting parameter values, etc.), personnel may need to configure numerous field devices (e.g., hundreds), which may require significant time expenditure and/or costly programming devices.

In circumstances where technicians connect to an enterprise solution to program configuration data, read/write access to the data can be slow (e.g., based on the communication protocols implemented throughout the enterprise to convey data) and/or require security measures (e.g., costly field programming devices) that may require significant time to gain access to the field devices. In particular, the technicians may need to use low bandwidth networks and/or networks that are undergoing heavy use. Accordingly, in such situations, among other situations where plant personnel are local to the field devices, it is sometimes desirable to enable the plant personnel to securely communicate with the field devices using portable devices that are able to configure the field devices locally without depending upon slow network communication speeds to store/retrieve information stored at a remote site.

In some instances, plant personnel carry portable handheld communicators via which they may communicate with a device of interest. However, in many such instances, physically connecting a portable communicator device to a field device requires the plant personnel to, for example, unscrew and remove a terminal cap of the field device. As a result, access is typically limited to field devices that are out of service because removing a terminal cap from a currently operating field device (e.g., a field device in service) may violate plant safety standards. To overcome this obstacle, intrinsically safe wireless transceivers have been implemented to communicate with field devices and then wirelessly transmit the data elsewhere, such as, for example, a handheld wireless receiver carried by nearby plant personnel. In some situations, it may not be feasible (e.g., cost and logistics of maintaining numerous devices) to equip numerous operators with a computer and/or portable device to program the field devices.

The above obstacles are overcome, and secure and cost-effective local communications with a field device, among various other advantages, are realized through the implementation of the teachings disclosed herein. In particular, the teachings disclosed herein achieve wireless communications through the use of radio frequency sensor tags (RFSTs), which utilize extremely energy efficient and cost-effective technology. The examples disclosed herein allow process control systems to use RFID authentication for voice programming and/or secure voice authentication to enable data communications between terminals and portable devices (e.g., cell phones, tablets, etc.), for example.

As used herein, the term "terminal" applies to any work station, operator station, field device, process control device, etc. and/or data interface of a process control system. As used herein, the terms "work station" or "operator station" may be used interchangeably, unless described otherwise to describe access points (e.g., network access points) of a process control system that may be used by an operator of the process control system. While the examples disclosed herein are shown as utilizing radio frequency sensor tags (RFSTs), the examples disclosed herein may be implemented as integrated RFID devices (e.g., operator carried RFID devices), portable devices, or any other appropriate communication devices. While many of the examples disclosed herein describe RFID communications, any appropriate protocol may be applied to the examples disclosed herein including Bluetooth, near field communication (NFC), or Wi-Fi, etc.

FIG. 1 is a schematic illustration of an example process control system 100 within which the teachings of this disclosure may be implemented. The example process control system 100 of FIG. 1 includes one or more process controllers (one of which is designated at reference numeral 102), one or more operator stations/terminals (one of which is designated at reference numeral 104), and one or more work stations/terminals (one of which is designated at reference numeral 106). The example process controller 102, the example operator station 104 and the example work station 106 are operatively coupled via a bus and/or local area network (LAN) 108, which is commonly referred to as an application control network (ACN).

The example operator station 104 of FIG. 1 allows an operator, engineer, and/or other plant personnel to review and/or operate one or more operator display screens and/or applications that enable the plant personnel to view process control system variables, states, conditions, alarms; change process control system settings (e.g., set points, operating states, clear alarms, silence alarms, etc.); configure and/or calibrate devices within the process control system 100; perform diagnostics of devices within the process control system 100; and/or otherwise interact with devices within the process control system 100.

The example work station 106 of FIG. 1 may be configured as an application station to perform one or more information technology applications, user-interactive applications and/or communication applications. In some examples, the work station 106 may be also used by the operator to set parameter/configuration value settings. For example, the work station 106 may be configured to perform primarily process control-related applications, while another work station (not shown) may be configured to perform primarily communication applications that enable the process control system 100 to communicate with other devices or systems using any desired communication media (e.g., wireless, hardwired, etc.) and protocols (e.g., HTTP, SOAP, etc.). The example operator station 104 and the example work station 106 of FIG. 1 may be implemented using one or more work stations and/or any other suitable computer systems and/or processing systems. For example, the operator station 104 and/or work station 106 could be implemented using single processor personal computers, single or multi-processor work stations, etc.

The example LAN 108 of FIG. 1 may be implemented using any desired communication medium and protocol. For example, the example LAN 108 may be based on a hardwired and/or wireless Ethernet communication scheme. However, any other suitable communication medium(s) and/or protocol(s) could be used. Further, although a single LAN 108 is illustrated in FIG. 1, more than one LAN and/or other alternative pieces of communication hardware may be used to provide redundant communication paths between the example systems of FIG. 1.

The example controller 102 of FIG. 1 may be, for example, a DeltaV™ controller sold by Fisher-Rosemount Systems, Inc. of Austin, Tex. However, any other controller could be used instead. Further, while only one controller 102 is shown in FIG. 1, additional controllers and/or process control platforms of any desired type and/or combination of types could be coupled to the LAN 108. In any case, the example controller 102 performs one or more process control routines associated with the process control system 100 that have been generated by a system engineer and/or other plant personnel using the operator station 104 and which have been downloaded to and/or instantiated in the controller 102.

As shown in the illustrated example of FIG. 1, the example controller 102 may be coupled to a plurality of smart process control devices (e.g., field devices) 110, 112, 114 via a data bus 116 and an input/output (I/O) gateway 118. Additional I/O devices (similar and/or identical to the I/O gateway 118) may be coupled to the controller 102 to enable additional groups of smart field process control devices.

In addition to the example smart process control devices (e.g., field devices) 110, 112, 114, coupled via the I/O gateway 118, one or more smart process control devices (e.g., field devices) 122 and/or one or more non-smart process control devices (e.g., field devices) 120 may be operatively coupled to the example controller 102. The example smart process control device 122 and non-smart process control device 120 of FIG. 1 may be, for example, devices that communicate with the controller 102 via respective hardwired links that communicate with the controller 102.

Additionally, each of the process control devices 110, 120, 122, the work station 106 and the operator station 104 is shown in the illustrated example of FIG. 1 coupled to a corresponding RFST (radio frequency sensor tag) (e.g., an RFID communication module) 124. With respect to the smart process control devices 110, 122, the work station 106 and the operator station 104 of the illustrated example, the corresponding RFST 124 may receive inbound configuration data obtained to configure the field process control 110, 122, the work station 106 and/or the operator station 104 (e.g., parameter values, inbound configuration data, information, etc.). In some examples, the RFST 124 may convert inbound data obtained from portable devices to be transmitted to and/or programmed into the process control devices 110, 122, the work station 106, the operator station 104 and/or other components of the process control system 100 according to the particular communication protocol. In some examples, process control device information, which may include field device settings to be shown/displayed to the operator, is also communicated to the RFST 124 via the corresponding field device.

Example manners of implementing the RFST 124 in accordance with the teachings described herein are shown and described below in connection with FIGS. 2-5. It should be appreciated that a single RFST 124 may be used to interact with more than one of the process control devices 110, 112, 114, 120, 122 and/or multiple workstations/operator stations by moving the RFST 124 from one device to another as dictated by the circumstances of the process system and the particular needs of plant personnel. Additionally or alternatively, as shown in FIG. 1, multiple RFSTs (e.g. connected individually or combined within a RFST module) may be connected to any or all of the work station 106, the operator station 104, the process control devices 110, 112, 114, 120, 122. More particularly, in some examples, each process control device 110, 112, 114, 120, 122 (or at least some of the process control devices), the work station 106 and/or the operator station 104 may be coupled to a separate RFST 124 and remain coupled to the corresponding RFST 124 throughout an entire lifecycle, or portion thereof, of the process control device. In some such examples, the RFST 124 contains a non-volatile memory 514 (FIG. 5A) separate from any memory internal to the corresponding process control device 122. In such examples, the RFST 124 is capable of storing configuration settings data and/or any other data associated with the identification, maintenance, configuration, and/or operation of the process control device 122. In some examples, the RFST 124 stores voice sample data (e.g., voice samples of authorized operators/users).

While FIG. 1 illustrates an example process control system 100 within which the methods and apparatus to communicate with process control system field devices, work stations and/or operator stations using an RFST described in greater detail below may be advantageously employed, the methods and apparatus described herein may, if desired, be advantageously employed in other process plants and/or process control systems of greater or less complexity (e.g., having more than one controller, across more than one geographic location, etc.) than the illustrated example of FIG. 1.

Figure 2:
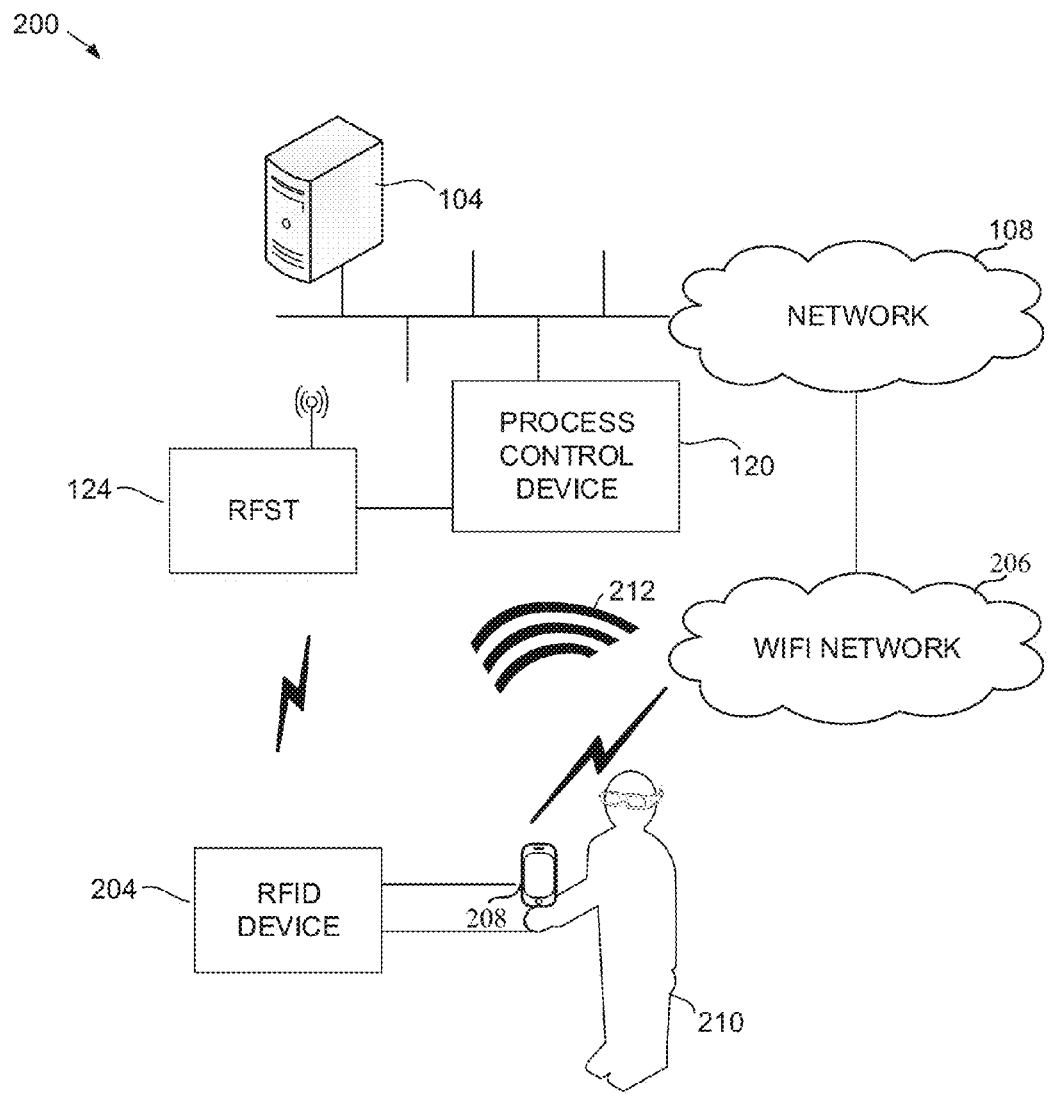
FIG. 2 illustrates an example configuration setting system in accordance with the teachings of this disclosure.

FIG. 2 illustrates an example configuration setting system 200 in accordance with the teachings of this disclosure. The example configuration setting system 200 includes the operator station 104, the LAN 108, the process control device 120 and/or a terminal access of the process control device 120, which may be positioned within an explosion-proof enclosure, for example, the radio frequency sensor tag (RFST) 124, an RFID device (e.g., an RFID tag, an RFID module, an RFID circuit, a device tag) 204, which may be communicatively coupled to the example RFST 124 as described in detail below in connection with FIG. 5A. In some examples, the example configuration setting system 200 includes a WIFI network 206 and a portable device (e.g., a cell phone) 208. In this example, an operator 210 is holding and/or wearing the RFID device 204, which may be integral with and/or communicatively coupled to the portable device 208, in relatively close proximity to the RFST 124 such that a presence of the RFID device 204 is detected by the RFST 124. In some examples, the operator 210 holds both the RFID device 204 and the portable device 208 as separate devices. In some examples, the operator carries the portable device 208, which may have NFC communication capabilities, instead of the RFID device 204, for example.

The RFST 124 of the illustrated example is communicatively coupled to the process control device 120 (e.g., via a computer of the process control device 120, a data bus associated with the process control device 120). Additionally or alternatively, the RFST 124 is communicatively coupled to the LAN 108 and/or the operator station 104 (e.g., used to configure process control devices at the operator station 104 via the LAN 108). In some examples, the RFST 124 is integral with (e.g., assembled within, uses existing interfaces/network hardware devices, etc.) the process control device 120 or the operator station 104. In this example, the RFID device 204 communicates with the RFST 124 via RFID communications (e.g., passive, semi-passive, active).

The RFID device 204 of the illustrated example is an RFID tag (e.g., a passive RFID device). While the RFID device 204 is described as an RFID tag in this example, the RFID device 204 may, alternatively, be a near field communication (NFC) device, a Bluetooth device, or a semi-passive RFID device (e.g., a backscattering RFID device). In other words, in some examples, the RFID device 204 is a communication module instead of an RFID tag.

In operation, the RFST 124 of the illustrated example detects a presence of the RFID device 204. The RFST 124, the process control device 120 and/or any other device of the configuration settings system 200 may be used to authenticate the RFID device 204 (e.g., to verify that the RFID device 204 is valid/authorized based on an RFID identifier such as an RFID code or string, a checksum, etc.). Once the RFID device 204 has been authenticated/verified by the RFST 124, for example, the RFST 124 enables/initiates a voice programming mode of the RFST 124. In this example, enabling the voice programming mode includes allowing the operator 210 to verbally program the process control device 120 through voice commands (e.g., voice instructions) 212, which may include verbal parameter values. For example, a microphone (e.g., an internal microphone) of the process control device 120 is used to receive the voice commands 212 that include configuration settings. In this example, once the RFID device 204 is authenticated, the operator 210 may recite flow parameter values (e.g., pipe configuration, fluid type/composition, pipe diameter, orifice diameter, base temperature, atmosphere, gas composition, etc.) via the voice commands 212 to be received by the microphone of the process control device 120, which is a flow computer in this example.

Alternatively, the RFST 124 may, instead, receive the voice commands 212 via a microphone disposed within the RFST 124. In particular, the RFST 124 may authenticate the voice commands 212 by comparing the voice commands 212 to pre-recorded samples. In some examples, the pre-recorded samples may be provided by (e.g., downloaded from, transmitted from) the RFID device 204 (e.g., after the RFID device 204 has been authenticated). Alternatively, the pre-recorded samples may be pre-programmed onto the RFST 124. In particular, voice samples may be downloaded/stored to the RFST 124 and/or the process control device 120 via the LAN 108 and/or a cellular network (e.g., via a secure connection). In some examples, each of the voice commands received (e.g., each command for each parameter) is compared to a corresponding sample. In other words, in some examples, every voice command issued is compared to pre-recorded voice samples to ensure that properly authorized personnel are providing the commands, thereby authenticating each command separately (e.g., independently). In some examples, the voice commands provided are compared to a library of voice samples (e.g., voice samples of multiple users/operators) obtained via the network 108. In some examples, a unique identifier in the RFID device 204 prompts a download of a respective voice sample (e.g., a voice sample or set of voice samples associated with the unique identifier) to one or more of the RFST 124 and/or the process control device 120 via the LAN 108, for example.

In some examples, the RFST 124 may communicate via NFC, Bluetooth or Wi-Fi-based interfaces (e.g., encrypted interfaces), etc. In some examples, the operator 210 may carry the pre-recorded voice samples on a tangible stored medium (e.g., a flash drive, Micro SD card, etc.), which may be inserted into the RFST 124 and/or the process control device 120 for voice authentication, for example. In some examples, the stored medium is verified by the RFST 124 (e.g., verified by unique identifiers and/or encryption). In some examples, data (e.g., an encoded file, an encrypted file) within the stored medium is verified via the network 108, for example, to allow use of the pre-recorded voice samples of the stored medium to authenticate received voice statements. In some examples, the stored medium is encrypted and/or the pre-recorded voice samples are encrypted within the stored medium. In some examples, the RFST 124 and/or the process control device 120 provide audible signals and/or visual prompts to the operator 210 that confirm the parameters set by the operator 210. In other examples, the RFST 124 is communicatively coupled to and/or integral with the work station 106.

In the illustrated example of FIG. 2, the operator 210 only needs to carry the RFID device 204 within a pre-defined range of the RFST 124 prior to voice programming, thereby reducing the need for carrying equipment and/or programming equipment, which may have associated capital and operational costs. Also, in some examples, the use of voice commands eliminates the need to plug in cumbersome programming equipment to the process control device 120 and/or the operator station 104.

Alternatively, in some examples, the operator 210 does not utilize a voice programming interface after a successful authentication and, instead, utilizes a device programming interface via the portable device 208 to program the process control device 120 after the successful authentication. For example, the RFID device 204 or an NFC interface of the device 208 may be authenticated which, in turn, enables programming of the process control device 120 from the portable device 208 via the WIFI network 206. In some examples, the RFST 124 authenticates the portable device 208 based on NFC communications of the portable device 208. As a result of this successful NFC authentication and/or successful authentication of the RFID device 204, the portable device 208 is permitted to program the process control device 120 via the WIFI network 206 and/or the LAN 108. Additionally or alternatively, the portable device 208 communicates with the process control device 104 via a WIFI or Bluetooth interface of the RFST 124, for example.

Figure 3:
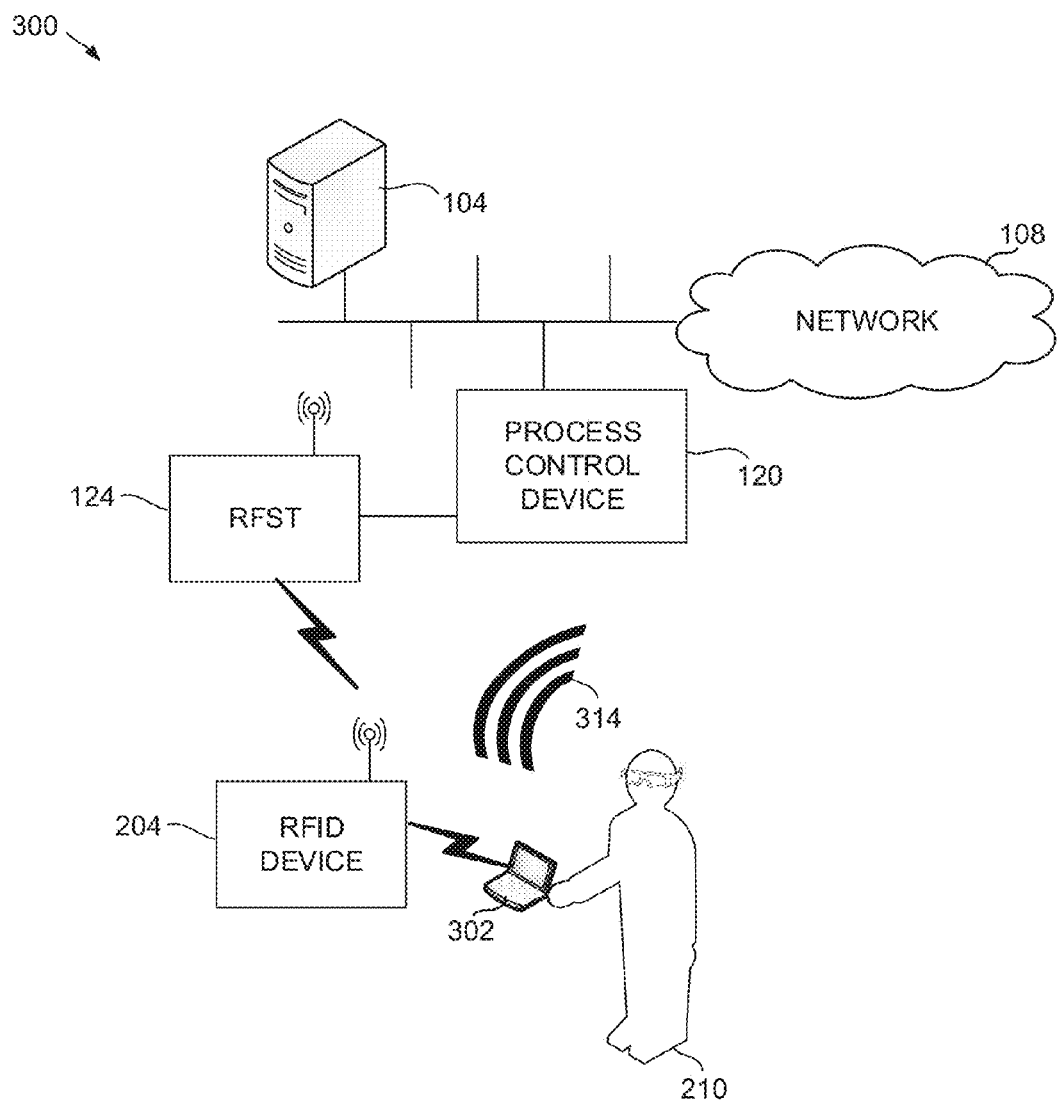
FIG. 3 illustrates another example configuration setting system.

FIG. 3 illustrates another example configuration setting system 300, which includes the operator station 104, the LAN 108, the RFST 124, the process control device 120, the RFID device 204 and a portable device (e.g., a laptop computer) 302. In the illustrated example of FIG. 3, voice authentication is used to allow/enable the portable device 302 to configure parameter settings of the process control device 120.

In the illustrated example of FIG. 3, the operator 210 speaks statements (e.g., commands, predefined words or phrases, etc.) 314 that are captured by the RFST 124. In this example, the voice statements 314 are then compared to pre-recorded voice samples to verify that the operator 210 is authorized to access the process control device 120 and/or other devices communicatively coupled to the LAN 108. In this example, the pre-recorded voice samples are accessed and/or obtained from (e.g., transmitted from, queried from, accessed from, etc.) the RFID device 204 (e.g., a storage device/memory of the RFID device 204). Once the voice statements 314 have been authenticated (e.g., verified), a communication link (e.g., wireless communication link) between the portable device 302 and the RFID device 204 is enabled. Alternatively, in some examples, once voice authentication is successful, a communication link between the portable device 302 and the RFST 124 and/or the process control device 120 may be established. In other examples, the portable device 302 of the illustrated example may directly interface with the RFST 124 for the RFST 124 to authenticate the portable device 302 once the voice statements from the operator 210 have been authenticated.

Figure 4:
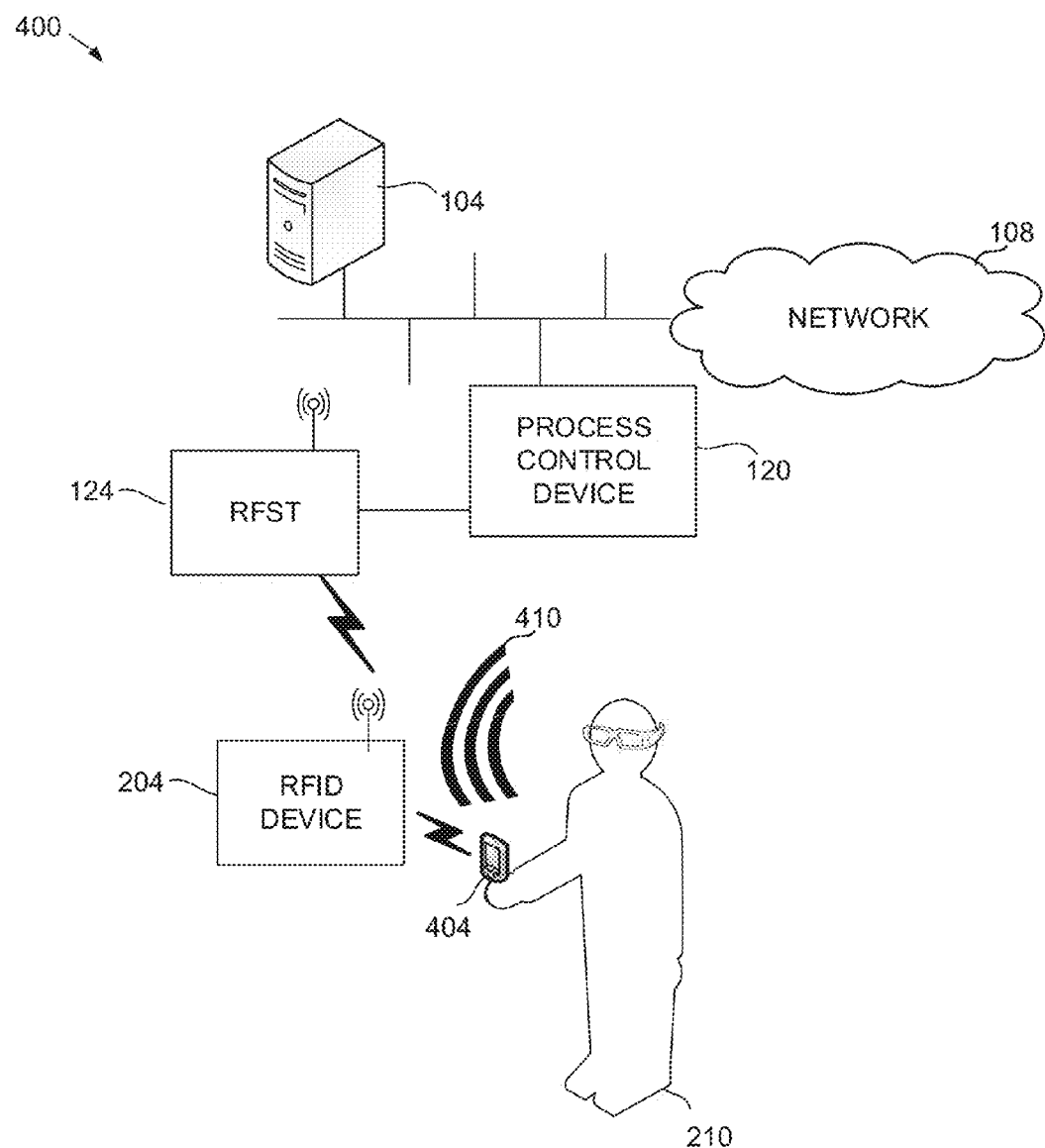
FIG. 4 illustrates yet another example configuration setting system.

FIG. 4 illustrates yet another example configuration setting system 400. The example configuration setting system 400 includes the operator station 104, the LAN 108, the process control device 120, the RFST 124, the RFID 204 and a portable device (e.g., a cell phone, a tablet, etc.) 404. In contrast to the example configuration setting system 300 of FIG. 3, in this example, the RFID device 204 of the illustrated example, instead of the RFST 124, authenticates and receives voice instructions/samples 410 from the operator 210. In some examples, the operator 210 recites a pre-defined phrase, which may be compared to a pre-recorded voice sample of the pre-defined phrase.

In other examples, the voice samples/instructions (e.g., statements) 410 from the operator 210 may be received at and authenticated by the portable device 404, which may, in turn, send a secure indication (e.g., an encrypted message, an encrypted indicator that conveys successful authentication) to the process control device 120 and/or the RFST 124. For example, the portable device 404, via a network (e.g., the LAN 108, a Wi-Fi network, a cellular network, etc.), may transmit/analyze the voice instructions/samples. In other examples, the RFID device 204 may directly interface with the process control device 120 instead of communicating via the RFID device 204. In other words, the RFID device 204 may have numerous components and/or features of the RFST 124 that are described below in connection with FIG. 5A.

Figure 5A:
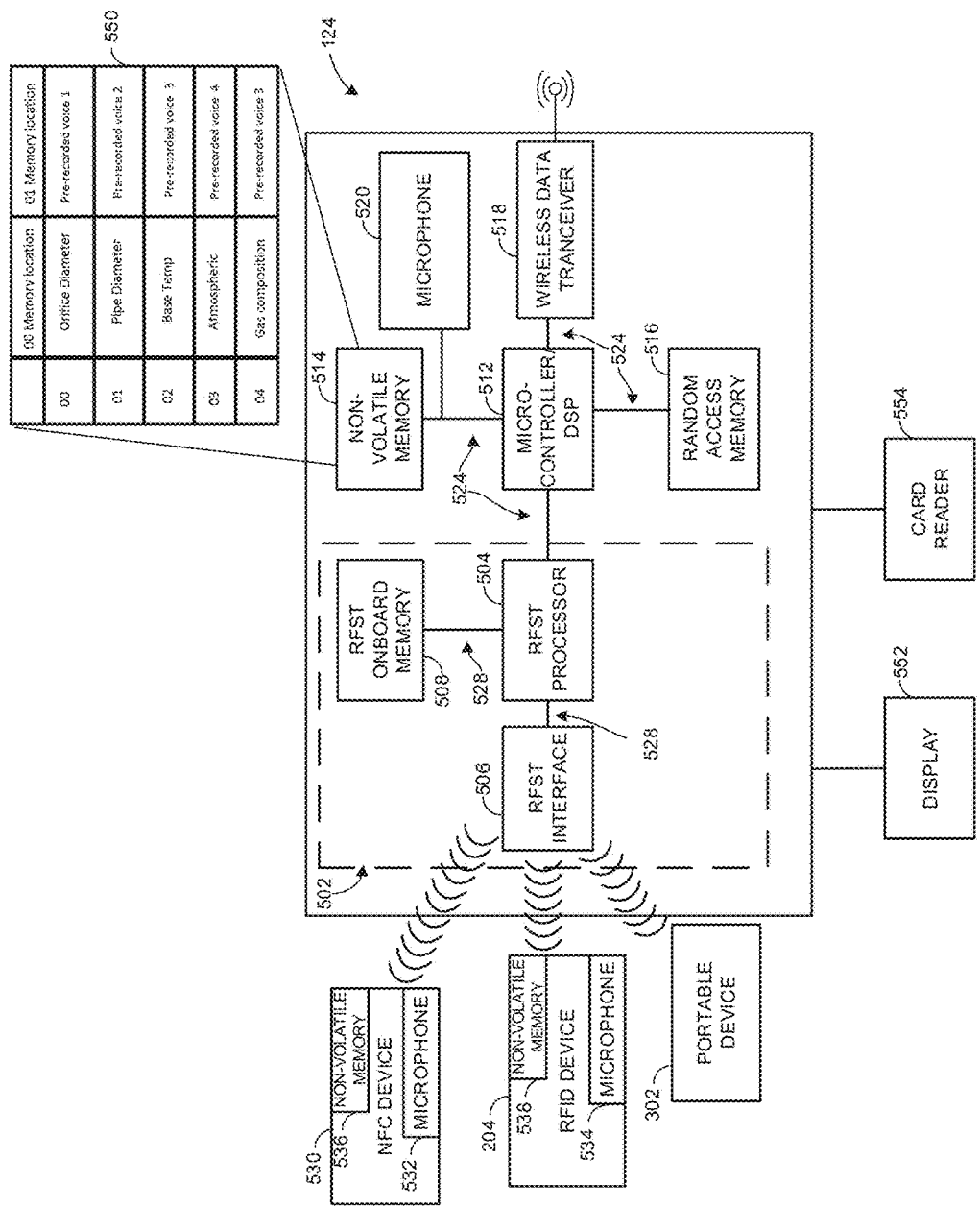
FIG. 5A illustrates an example RFST module that may be used with the examples disclosed herein.

FIG. 5A illustrates the example RFST (e.g., RFST module, RFID module, Bluetooth module, NFC module, etc.) 124 of FIGS. 2-4 that may be used in the examples disclosed herein. The example RFST 124 includes an RFST circuit 502, which includes an RFST processor 504, an RFST interface (e.g., a passive or semi-passive RFID interface, an active RFID interface, an NFC interface, a Wi-Fi interface, a Bluetooth interface, etc.) 506 and RFST onboard memory 508. The example RFST module 124 also includes a microcontroller 512, the aforementioned non-volatile memory 514, random access memory 516, a wireless data transceiver 518 and a microphone 520. In the illustrated example of FIG. 5A, the RFST 124 may be in communication with a near field chip (NFC) device, the RFID device 204 or the portable device 302, depending on interfaces present within the RFST 124. The non-volatile memory 514, the microcontroller 512, the random access memory 516, the microphone 520 and the wireless data transceiver 518 of the illustrated example are interconnected via communication lines 524. Likewise, in this example, the RFST interface 506, the RFST onboard memory 508 and the RFST processor of the RFST circuit 502 are communicatively coupled via communication lines 528.

In operation, the RFST circuit 502 of the illustrated example receives/detects an identification signal (e.g., an RFID identification signal, an RFID identifier, a character string, etc.) from the RFID device 204, for example. In this example, the RFST processor 504 receives the identification signals and may store (e.g., temporarily store) the identification signal in the RFST onboard memory 508 so that the microcontroller 512 can transition the RFST 124 into a mode (e.g., a voice programming mode) where voice commands may be received. In this example, the voice commands are received to configure/set parameters (e.g., parameter values) for a flow computer of a process control system. In particular, the microcontroller 512 may communicate with one or more of the RFST processor 504 or the RFST onboard memory 508 to verify the authentication signal and, as a result, enables a digital signal processor (DSP) to analyze voice commands from an operator that are received at the microphone 520 to set configuration parameters (e.g., a voice programming mode). In this examples, the microcontroller 512, which may integral with a digital signal processor (DSP), analyzes the voice commands and, accordingly, set a respective configuration parameter setting.

In some examples, during voice programming, as the voice commands are received from the operator at the microphone 520, the microcontroller 512 compares the voice commands to pre-recorded voice recordings (e.g., pre-recorded samples, pre-recorded phrases such as "one," "nine," "toggle," "enable," "disable," "next," "configuration," "diameter," "flow rate," etc.), which may be stored in the non-volatile memory 514, for example. In some examples, each of the voice commands received (e.g., each configuration parameter setting) at the microphone 520 is compared to the pre-recorded voice recordings, thereby authenticating each of the voice commands received at the microphone 520. In other words, the microcontroller 512 may authenticate each of the voice commands separately (e.g., independently) instead of authenticating a portion of the voice commands and/or the voice commands as a group. Once the voice commands are received and authenticated, corresponding configuration settings are then transmitted to and/or stored on a respective process control device, workstation, operator station and/or network (e.g., the LAN 108) via the wireless data transceiver 518, for example.

In some examples, once the identification signal is not received and/or is interrupted (e.g., the RFID device 204 at a distance that exceeds its communication range), the microcontroller 512 prevents the microphone 520 from receiving any further voice commands and/or prevents the microcontroller 512 from processing voice commands received. In some examples, the pre-recorded voice samples that are compared to voice commands measured at the microphone 520 are obtained via the LAN 108 through the wireless data transceiver 518, for example.

In some examples, the NFC device 530 includes a microphone 532, which may be used to receive voice commands and/or used to program/record pre-recorded voice samples. Likewise, in some examples, the RFID device 204 includes a microphone 534 that may be used to receive voice commands and/or program pre-recorded voice samples.

While example components of FIG. 5A are shown in the RFST 124, any of the components described in connection with FIG. 5A may be included in and/or features may be associated with other elements (e.g., the RFID device 204, the portable device 302, the portable device 404, etc.). In some examples, the NFC device 530 includes a non-volatile memory 536 to store pre-recorded voice samples. Similarly, in some examples, the RFID device 204 includes a non-volatile memory 538 to store pre-recorded voice samples. In examples where pre-recorded voice samples are not stored and/or analyzed by the RFST 124, the devices that store the pre-recorded voice samples may, instead, analyze issued voice commands with respect to the pre-recorded voice samples. In other words, voice command analysis/authorization may occur in a different component than the RFST 124.

An example data structure 550 illustrates how configuration/settings may be stored/programmed and/or organized from voice commands. In the example data structure 550, configurations and/or parameter values are mapped to pre-recorded voice samples. In particular, these mappings are used during voice programming when the pre-recorded samples are compared to voice commands. The voice commands may include parameter names, numerical values (e.g., "0" to "9," etc.), characters (e.g., "A" through "Z") and/or control commands (e.g., "OK," "back," "main menu" and "cancel"). One of the advantages of pre-recording the voice samples in conjunction with mapping besides security authentication is that parameters/values/strings may be associated with values based on memory address (e.g., locations within the data structure 550) instead of language. In other words, the values/parameters set by the operator may be independent of language because of the pre-recorded voice samples are mapped in an organized array of data such as that shown in the data structure 550.

In some examples, parameters (e.g., parameter values, configuration settings, parameter toggles, etc.) may be set/stored by the voice commands received at the microphone 520. In some examples, the operator confirms parameter settings with a verbal command such as "ok" or "confirmed." In some examples, the operator may cancel and/or reset a configuration setting using a verbal command such as "cancel" or "reset." Additionally or alternatively, the parameter values are displayed to the operator via a display 552, which may be associated with the RFST 124 and/or any other device in communication with the RFST 124. Additionally or alternatively, in some examples, the RFST 124 is communicatively coupled to and/or includes a card reader 554 for the operator to insert a memory card (e.g., an SD card, a flash card, a USB drive, etc.) that may have voice samples and/or the data structure 550 so that the microcontroller 512 can access and compare voice commands received at the microphone 520, the microphone 532 and/or the microphone 534 to the pre-recorded voice samples, for example. Examples of how a recorded and/or encrypted memory card may be used to configure parameters via voice commands dictated by an operator is described below in connection with FIG. 5B.

Figure 5B:
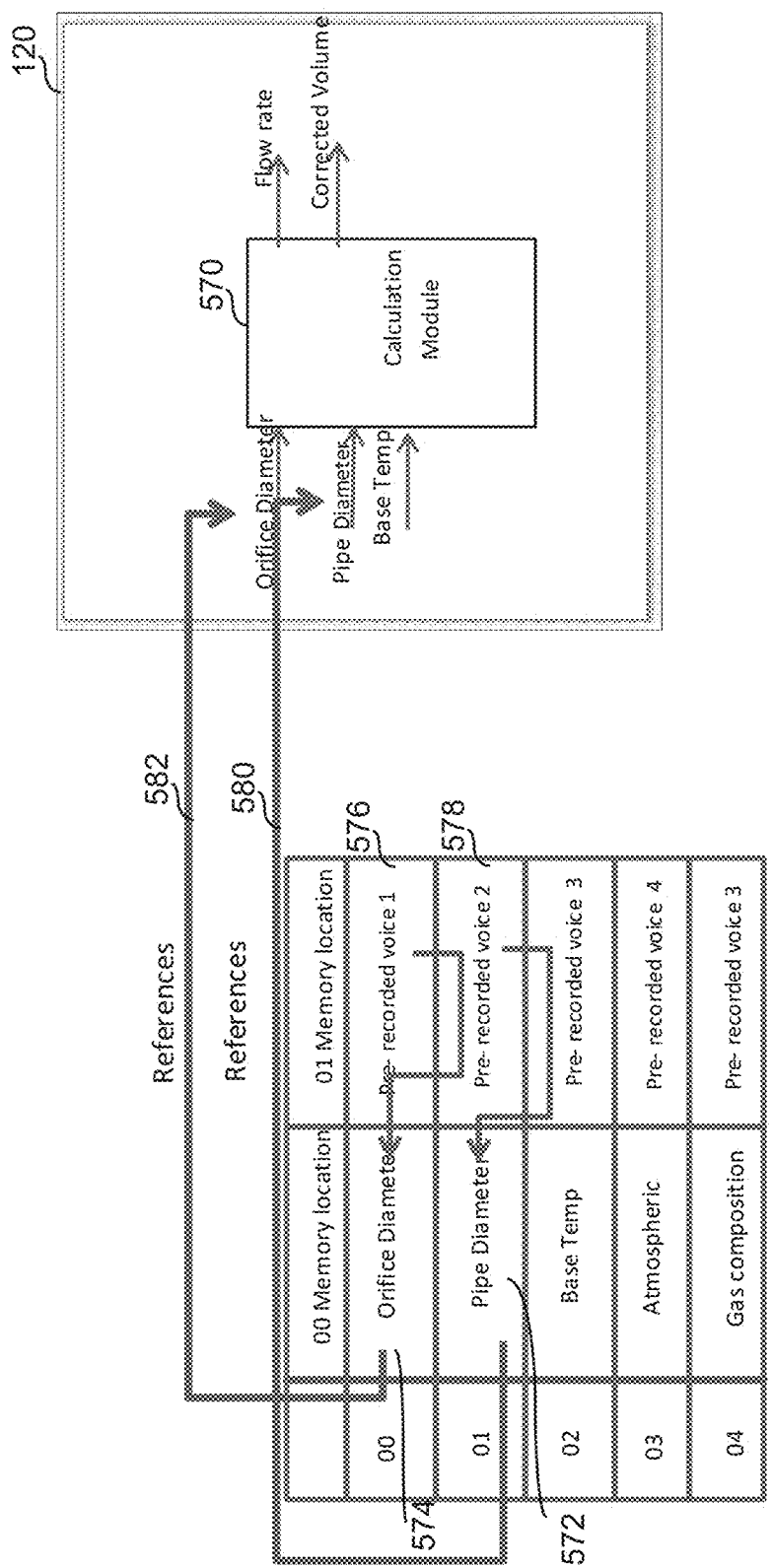
FIG. 5B illustrates how an example data structure 550 of FIG. 5 may be used to define process control settings.

FIG. 5B illustrates how the data structure 550 of FIG. 5A may be used by a processor and/or calculation module (e.g., calculation circuit) 570 of the controller 102, for example, to define process control settings. In some examples, the processor/calculation module 570 may be part of the microcontroller 512 and/or the data structure 550 may be accessed/analyzed by the microcontroller 512. In this example, the data structure 550 has been accessed from a memory card inserted into the card reader 554. However, in other examples, the data structure 550 may be obtained from the non-volatile memory 536 of the NFC device 530, the non-volatile memory 548 of the RFID device 204, or the portable device 302, for example.

In this example, process parameters (e.g., process variables) 572, 574 are pre-programmed onto the memory card at "XXX0" (e.g., 0000, 0100, 0200, etc.) memory locations by a manufacturer of the process control system. In particular, the process parameters 572, 574 may be encrypted onto the memory card via secured tags (e.g., ID tags, secured variables, etc.) when the memory card is programmed by the manufacturer. Respective recorded voice samples 576, 578, which may be recorded at a customer site, are recorded onto the data structure 550 at corresponding memory locations "XXX1" (e.g., 0001, 0101, 0201, etc.) of the memory card. In some examples, programming of the voice samples 576, 578 is only allowed when a recording system is authenticated and/or the memory card is authenticated (e.g., the recording system and memory card both authenticate one another). In this example, the voice samples 576, 578 of the illustrated are associated with the process parameters 572, 574, respectively, by memory address locations and/or during the writing/recording of the voice samples 576, 578, for example.

In operation, the process parameters 572, 574 and the associated pre-recorded voices 576, 578 are referenced/accessed via communication lines 580, 582, respectively, (e.g., communication lines at least partially defined by the RFST 124) by the processor 570. In turn, the example processor 570 authenticates the voice samples 576, 578 to voice statements received at a microphone. Once the voice samples 576, 578 have been authenticated, the processor 570 uses process control values recorded at the microphone to configure process control settings (e.g., flow rate, corrected volume, etc.).

In scenarios where an unauthorized person has a memory card with recorded voice commands, but without the secure/encrypted process parameters 572, 574, the unauthorized person would be prevented from successfully authenticating the memory card and, thus, will not be permitted to program a process control device via voice commands. In scenarios where the memory card has been stolen, an unauthorized user would be prevented from programming a process control device via voice commands because his or her voice statements would be distinct from the voice samples 576, 578. In scenarios where an operator is no longer authorized, an administrator may obtain the memory card and/or erase the voice samples 576, 578 to record new voice samples from a newly authorized operator.

While an example manner of implementing the RFST 124 of FIGS. 2-4 is illustrated in FIGS. 5A and 5B, one or more of the elements, processes and/or devices illustrated in FIGS. 5A and 5B may be combined, divided, re-arranged, omitted, eliminated and/or implemented in any other way. Further, the example RFST processor 504, the example RFST interface 506, the example RFST onboard memory 508, the example microcontroller/DSP 512, the example non-volatile memory 514, the example random access memory 516, the example wireless data transceiver 518, the example microphone 520, the processor 570, and/or, more generally, the example RFST 124 of FIGS. 2-5B may be implemented by hardware, software, firmware and/or any combination of hardware, software and/or firmware. Thus, for example, any of the example RFST processor 504, the example RFST interface 506, the example RFST onboard memory 508, the example microcontroller/DSP 512, the example non-volatile memory 514, the example random access memory 516, the example wireless data transceiver 518, the example microphone 520, the processor 570, and/or, more generally, the example RFST 124 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, RFST processor 504, the example RFST interface 506, the example RFST onboard memory 508, the example microcontroller/DSP 512, the example non-volatile memory 514, the example random access memory 516, the example wireless data transceiver 518, the example microphone 520, and/or the processor 570 is/are hereby expressly defined to include a tangible computer readable storage device or storage disk such as a memory, a digital versatile disk (DVD), a compact disk (CD), a Blu-ray disk, etc. storing the software and/or firmware. Further still, the example RFST 124 of FIGS. 2-5B may include one or more elements, processes and/or devices in addition to, or instead of, those illustrated in FIGS. 5A and 5B, and/or may include more than one of any or all of the illustrated elements, processes and devices.

Figure 6:
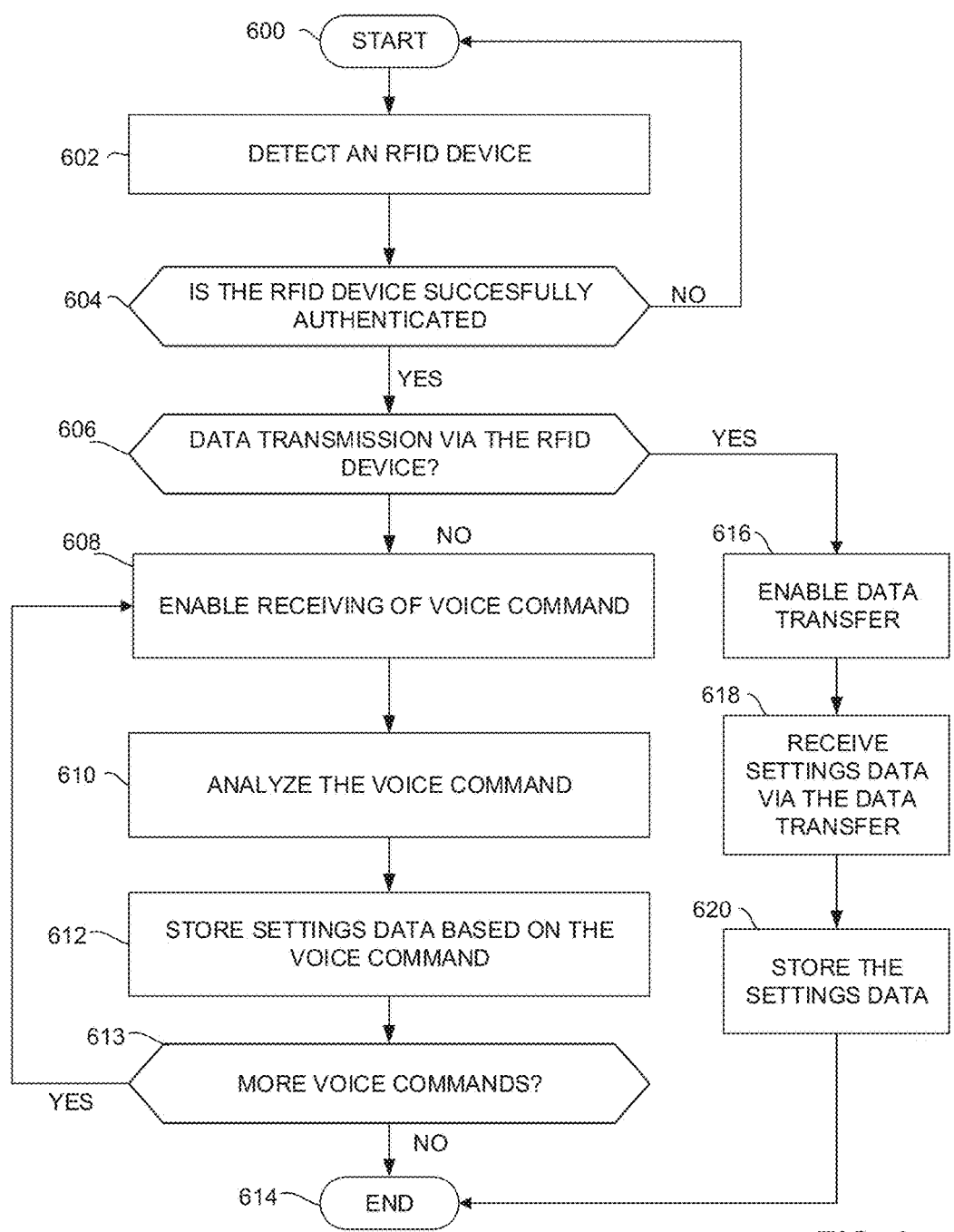
FIG. 6 is a flowchart representative of an example method that may be used to implement the examples disclosed herein.
Figure 7A:
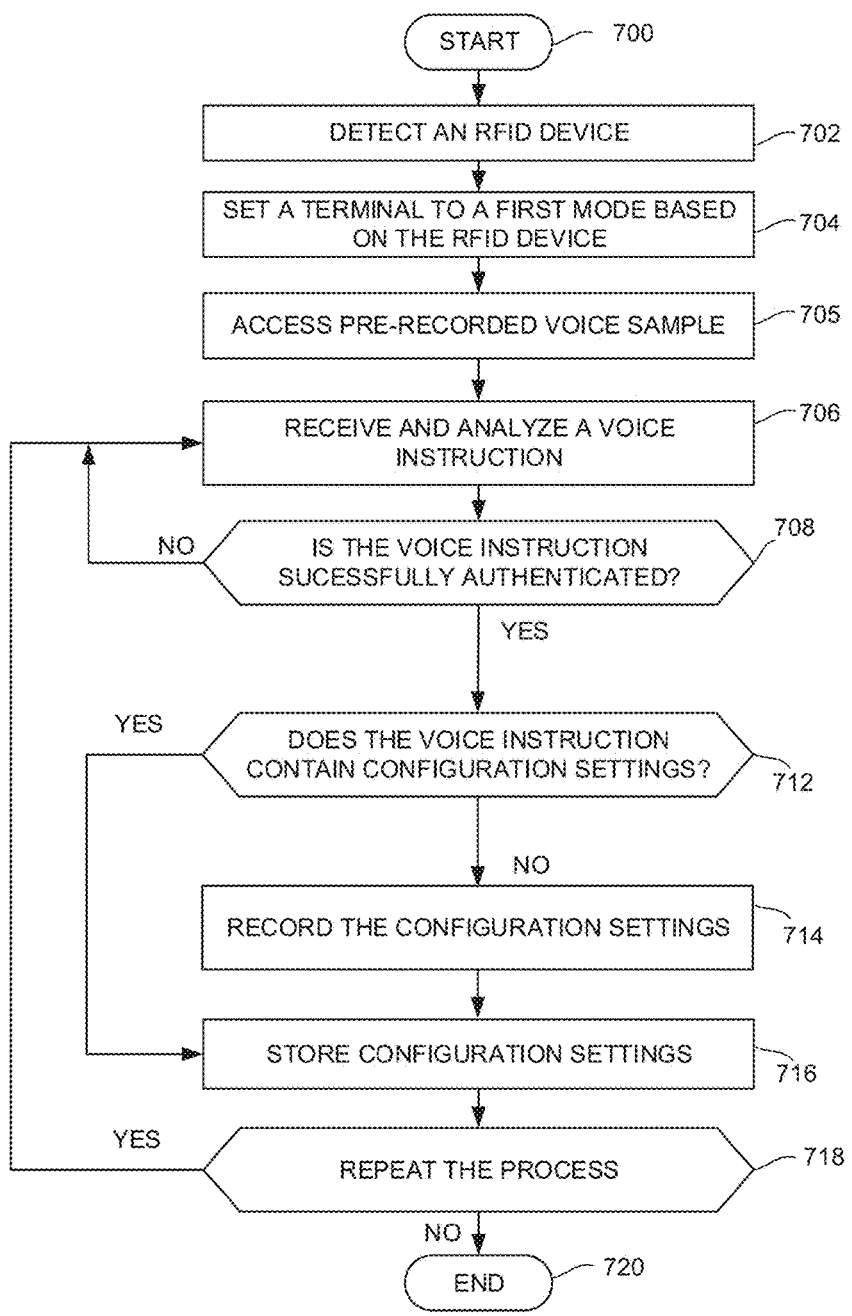
FIG. 7A is another flowchart representative of an example method that may be used to implement the examples disclosed herein.
Figure 7B:
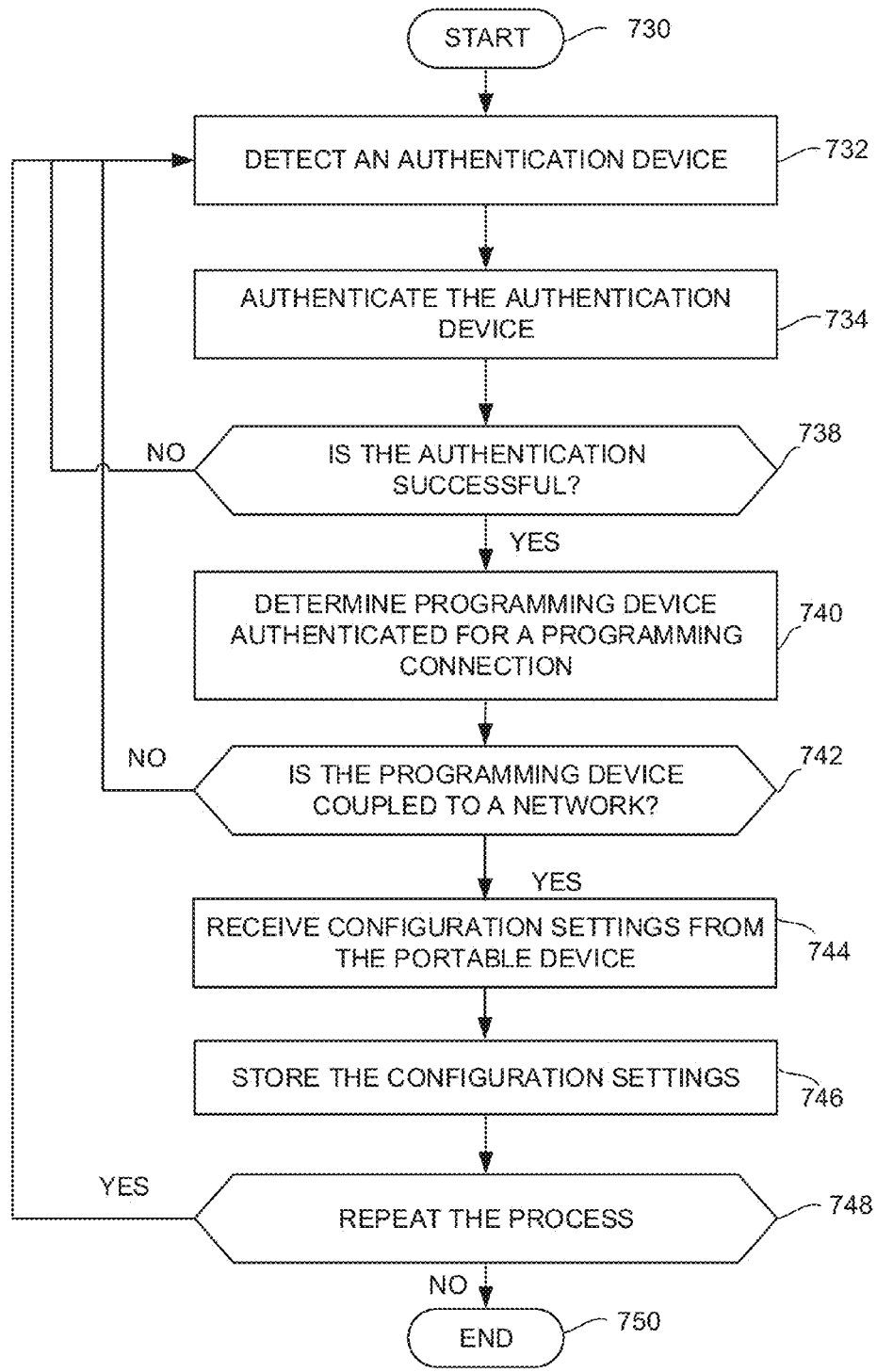
FIG. 7B is another flowchart representative of an example method that may be used to implement the examples disclosed herein.
Figure 8:
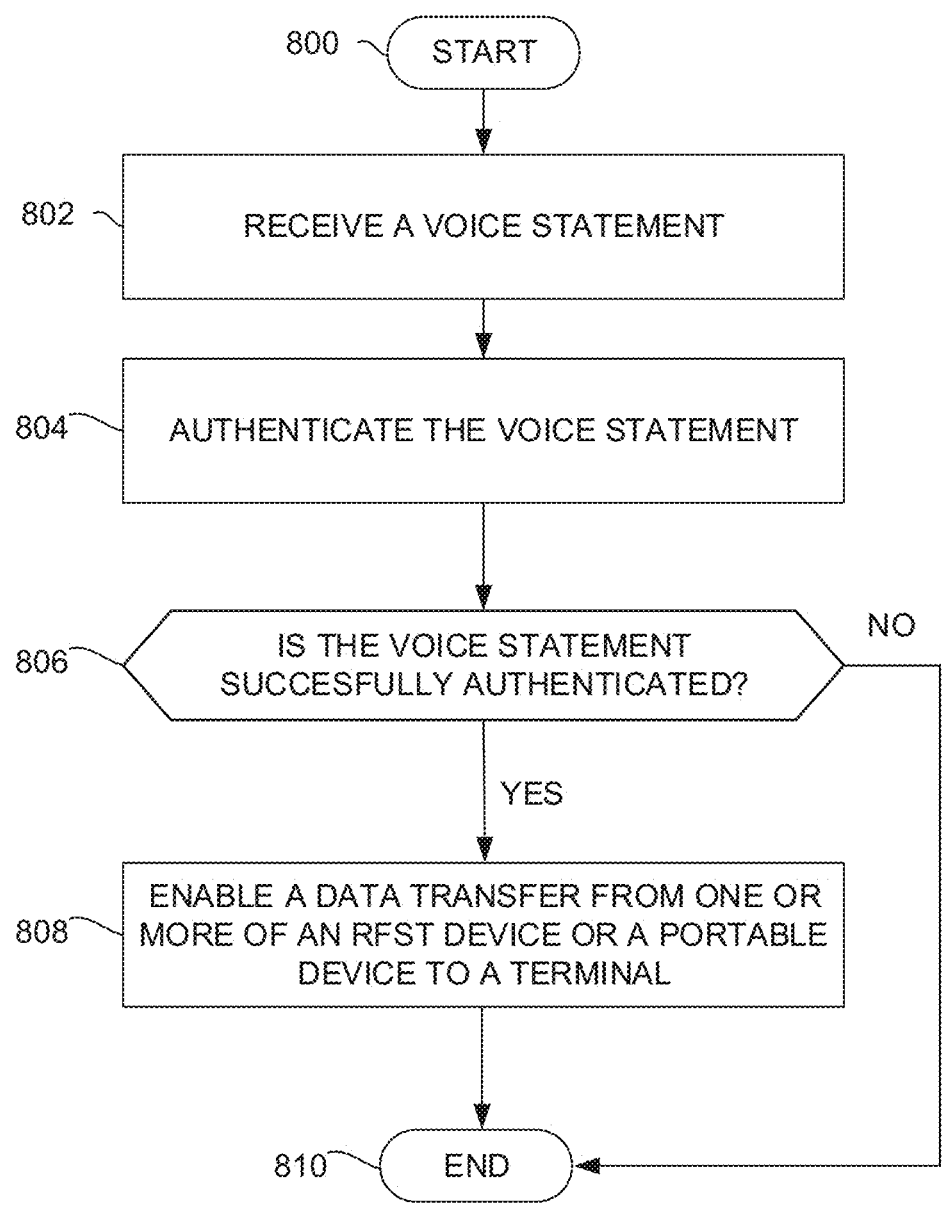
FIG. 8 is yet another flowchart representative of an example method that may be used to implement the examples disclosed herein.

Flowcharts representative of example methods for implementing the RFST 124 of FIGS. 2-5B is shown in FIGS. 6-8. In these examples, the methods may be implemented using machine readable instructions that comprise a program for execution by a processor such as the processor 912 shown in the example processor platform 900 discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIGS. 6-8, many other methods of implementing the example RFST 124 may alternatively be used. For example, the order of execution of the blocks may be changed, and/or some of the blocks described may be changed, eliminated, or combined.

As mentioned above, the example methods of FIGS. 6-8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 6-8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 6 is a flowchart representative of an example method that may be used to implement the examples disclosed herein. The example method begins at block 600 where an RFID device (e.g., the RFID device 204) of a process control configuration system is within a pre-defined communication range (e.g., defined by hardware limitations) of an RFST (e.g., the RFST 124). The RFID device is detected by the RFST (block 602). Next, it is determined whether the RFID device has been successfully authenticated (e.g., whether the identification transmitted from the RFID device is authorized) (block 604).

If it is determined that the RFID device has been successfully authenticated (block 604), the process proceeds to block 606, where it is determined whether communication will be established between a terminal (e.g., the work station 106, the operator station 104, a remote terminal unit (RTU), etc.) and a communication device (e.g. a portable device, an RFID device, etc.) (block 606). For example, the RFID device may act as an enabling device (e.g., enables data transmission between other devices) or an intermediary (e.g., the RFID receives and transmits data). This determination may occur based on the hardware configuration of the RFST and/or any other component associated with the process control configuration system. If it is determined that the RFID device has not been successfully authenticated (block 604), control of the process returns to block 600.

Next, it is determined whether a data transmission (e.g., a transmission of configuration parameter values) is to occur via the RFID device (block 606). Such a determination may occur based on an availability of hardware (e.g., whether certain hardware is within range of the RFST) and/or whether the RFST is in a voice command programming mode (e.g., based on an RFID identifier being verified by the RFST). If it is determined that the RFID device is not to be used for data transmissions (block 606), the process proceeds to block 608, where the RFST may, for example, be enabled to receive voice commands from an operator (block 608). In some examples, the RFST may enable analysis (e.g., a digital signal processor analysis) of sounds received from a microphone (e.g., the microphone 520) to determine verbal instructions/settings issued and/or whether the voice commands are authorized (block 610). In particular, the RFST may compare the sounds received at the microphone to pre-recorded samples (e.g., pre-recorded numbers, phrases, etc.) to determine whether the sounds received are authorized. Based on the analysis of the voice commands received (e.g., the sounds have been authenticated and/or processed into voice commands), the RFST may store the settings data (e.g., on a work station and/or process control device communicatively coupled to the RFST) (block 612).

Next it is determined whether there are additional voice commands to be received (block 613). If no further voice commands are to be received (block 613), the process ends (block 614). If there are more voice commands to be received (block 613), control of the process returns to block 608. This determination may occur by prompts provided by the operator (e.g., a pre-defined phrase that signals an end to the operator provided input), when all of the configuration parameters have been configured, and/or after a time threshold has been exceeded after receiving a previous command (e.g., the RFST is configured to receive additional voice commands before a pre-defined time frame has been exceeded and the RFST voice detection times out).

Alternatively, if it is determined that the data transfer will be initiated, for example, by the RFID device instead of the voice commands (block 606), the process proceeds to block 616 where an RFST data transfer is enabled (block 616). For example, the RFST may enable direct data communications between a portable device (e.g., a laptop, a cell phone a tablet) and a process control device and/or work station. Additionally or alternatively, the data transfer may occur via the RFST (e.g., from a portable device to the RFST and then to the process control device and/or the operator station/terminal). In some examples, the data transfer occurs between the portable device and the RFID device, and also between the RFID device and the process control device and/or operator station.

Next, the data transfer enabled by the RFST and/or via the RFST is used to receive settings data at a work station and/or process control device, for example (block 618). The settings data is then stored (block 620) and the process ends (block 614).

FIG. 7A is another flowchart representative of another example method that may be used to implement the examples disclosed herein. The example method begins at block 700 where an RFID device has just been placed proximate an RFST (e.g., within a defined communication range), which is communicatively coupled to a terminal (block 700). The RFST detects the RFID device based on proximity (block 702). Based on the detection, the terminal and/or the RFST is set to a first mode (e.g., a programming mode, a configuration setting mode, etc.) (block 704).

In this example, the terminal and/or the RFST accesses a pre-recorded sample that is stored and/or programmed on the RFID device, for example (block 705). In some examples, the RFST downloads the pre-recorded sample via a network (e.g., the LAN 108) or a cellular network. Next, a voice command/instruction is received at a microphone such as the microphone 520 of FIG. 5A and analyzed and/or authenticated by a DSP and/or a microcontroller such as the example microcontroller 512 of FIG. 5A (e.g., both the authentication and analysis are performed simultaneously by the DSP as the voice command/instruction is being received) (block 706). For example, the voice command/instruction may be analyzed using pre-recorded voice samples (e.g., voice samples that correspond to specific commands, parameters and/or values) and/or speech recognition algorithms to determine a command from the voice instruction. The microphone of the illustrated example may be located on the RFID device, the RFST and/or the terminal. In some examples, the voice command/instruction is not authenticated (e.g., when the RFID device is authenticated), but analyzed for voice instruction(s)/command(s).

Next, in some examples, it is determined if the voice instruction is successfully authenticated (block 708). If the voice instruction is not successfully authenticated (block 708), the process returns control to block 706. However, if the voice instruction is successfully authenticated (block 708), it is then determined whether the analyzed voice sample contains configuration settings (block 712). This may occur via analytical comparisons to the pre-recorded voice samples, which may be obtained from a network (e.g., the LAN 108) based on an identifier in the RFID device, for example. If it is determined that the analyzed voice sample does not include configurations settings and/or commands (block 712), the process proceeds to block 714, where further voice instruction(s) are received that include configuration settings after the operator is prompted, via a display and/or audible instructions, for example, to provide the configuration settings (block 714). In some examples, the display does not show a parameter value unless the analyzed voice instruction is authenticated. Once the voice command with the configuration settings has been recorded, the configuration settings are stored in a memory device such as the non-volatile memory 514 of FIG. 5A or a memory device of a respective process control device, for example (block 716). If the voice sample does contain configuration settings (block 712), control of the process proceeds to block 716.

It is then determined whether the process is to be repeated (block 718). If the process is not to be repeated (block 718), the process ends (block 720). However, if the process is to be repeated, control of the process returns to block 706. In some examples, this determination may occur when all configuration settings of process control device have been set (e.g., six out of six configuration parameters have been set) or when the operator prompts/commands the process to end. In some examples, the process may automatically repeat upon a detection of sound or a voice at the microphone.

FIG. 7B is another flowchart representative of another example method that may be used to implement the examples disclosed herein. The process of FIG. 7B begins at block 730 where a portable device (e.g., the portable device 208) is to be used to program a process control device. In this example, voice programming or voice authentication is not used.

An authentication device and/or circuit is detected (block 732). For example an RFID device and/or an NFC device may be detected in proximity of an RFST (e.g., the RFST 124). In some examples, the NFC device, which may be part of a portable device (e.g., the portable device 208), is detected by the RFST. In some examples, the RFID device may be communicatively coupled to the portable device.

Next, the authentication device is authenticated (block 734). For example, the RFST, which may be located within an explosion proof enclosure, may authenticate an RFID tag or a portable device with an NFC circuit.

It is then determined if the authentication is successful (block 738). If it is not successful, control of the process returns to the block 732. If it is successful (block 738), the process then proceeds to block 740.

Next, a programming device (e.g., a portable device) authenticated/permitted for a programming connection is identified (block 740). For example, the programming device is identified during the authentication process (e.g., as data defined by an authentication protocol and/or data) and/or the programming device is identified as being part of the authentication device (e.g., an NFC chip/circuit of a portable device). Additionally or alternatively, the programming device is identified based on communication with a network (e.g., the WIFI network 208), in which information and/or identifiers corresponding to the authenticated programming device may be retrieved from the network, for example.

If the programming device is not communicatively coupled to the network (block 742), control of the process returns to block 732. However, if the programming device is communicatively coupled to the network (block 742), the process then proceeds to block 744.

Configuration settings are received from the programming device (block 744) and/or the configuration settings are stored (block 746).

It is then determined whether the process is to be repeated (block 748). If the process is to be repeated (block 748), control of the process returns to block 732. However, if the process is not to be repeated (block 748), the process ends (block 750).

FIG. 8 is yet another flowchart representative of an example method that may be used to implement the examples disclosed herein. In contrast to the example methods of FIGS. 6, 7A and 7B, the example method of FIG. 8 utilizes voice authentication to enable data communications between a portable device (e.g., a laptop, a cell phone, a data storage device) and a process control device and/or process control workstation/terminal via an associated (e.g., associated with the process control equipment) RFST device (e.g., the RFST 124). The example method of FIG. 8 begins at block 800 where an operator of the process control device with the associated RFST is to program configurations settings to a process control device using the RFST. In this example, the RFST receives/detects a voice statement from the operator (block 802). In other examples, any other device (e.g., the work station 106, the operator station 104 and/or any other associated communication devices, etc.) may receive (e.g., record) the voice sample.

Next, the voice statement is authenticated (block 804). In this example, a pre-recorded voice sample, which is stored/programmed onto the RFST, is used to authenticate the received voice statement via a comparison (e.g., a comparison analysis performed by a DSP) between the voice statement and the voice sample. In some examples, a pre-recorded voice sample is used to authenticate the voice statement. It is then determined if the received voice statement has been successfully authenticated (block 806). If the received voice statement has been successfully authenticated (block 806), a data transfer is enabled from one or more of the RFST device, or a portable device (e.g., a portable device held by the operator) with a terminal associated with a process control device/system (e.g., a flow computer) (block 808). For example, the successful voice authentication may allow a portable device (e.g., a laptop) such as the portable device 302 of FIG. 3 to program the process control device/system via the RFST (e.g., transmit configuration settings). After the process control device/system has been programmed, the process ends (block 810). Otherwise, if the received voice statement has not been authenticated (block 806), the process ends (block 810).

In some examples, voice authentication via the RFST enables the portable device to directly access/program the process control device/system. Alternatively, an RFID device, for example, may authenticate a voice statement and/or act as a programming intermediary between the portable device and the process control device/system.

Figure 9:
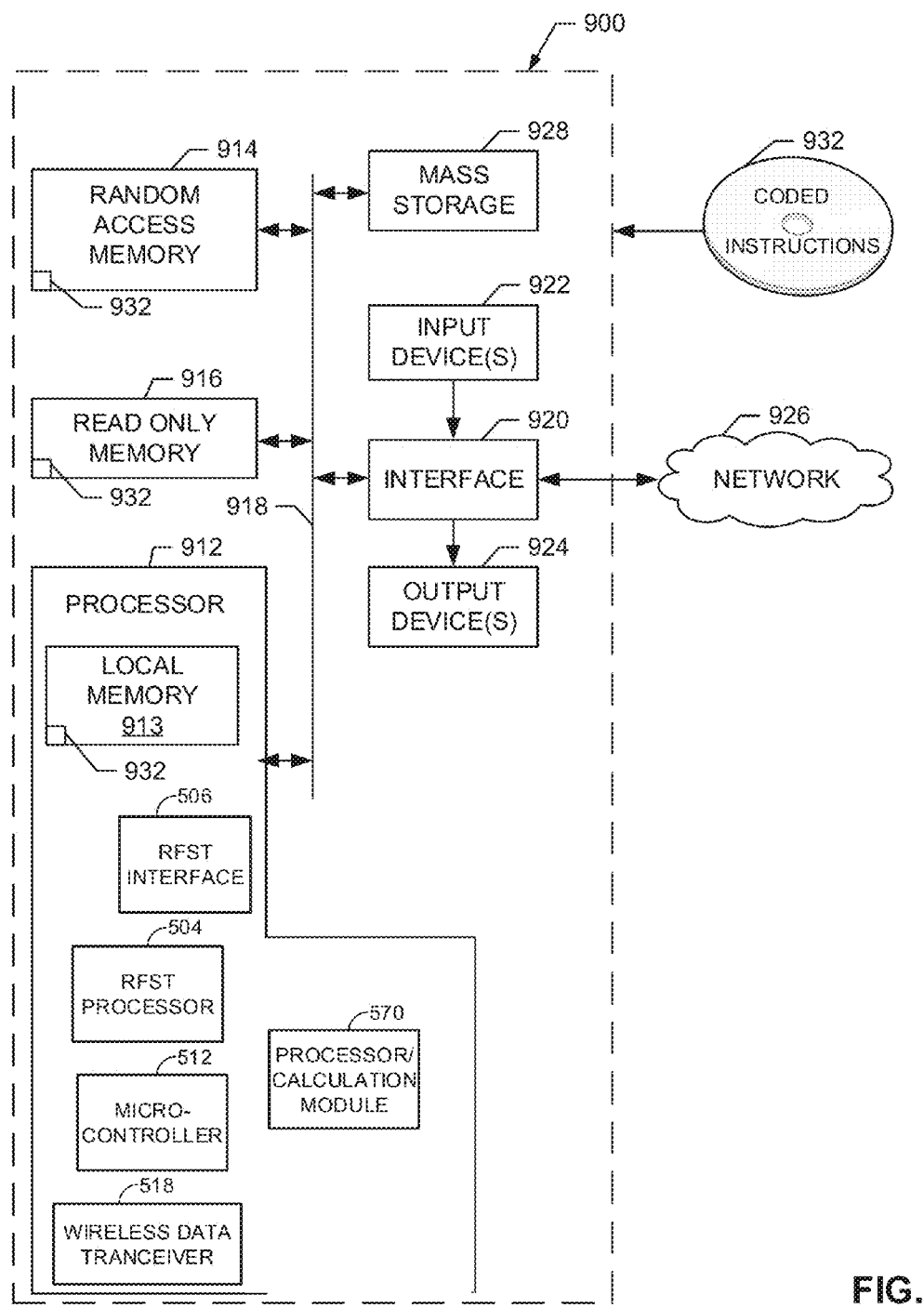
FIG. 9 is a block diagram of an example processor platform capable of executing instructions to implement the example methods of FIGS. 6-8.

FIG. 9 is a block diagram of an example processor platform 900 capable of executing instructions to implement the example methods of FIGS. 6-8 and the example RFST 124 of FIGS. 2-5. The processor platform 900 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache). The example processor 912 also includes the RFST interface 506, the RFST processor 504, the microcontroller 512, the wireless data transceiver 518, and the processor 570. The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

Coded instructions 932 to implement the methods of FIGS. 6-8 may be stored in the mass storage device 928, in the volatile memory 914, in the non-volatile memory 916, and/or on a removable tangible computer readable storage medium such as a CD or DVD.

From the foregoing, it will be appreciated that the above disclosed methods, apparatus and articles of manufacture allow efficient and secure programming of process control devices using a voice interface. The examples disclosed herein allow secure programming of process control devices using voice commands. The examples disclosed herein also allow voice programming to be customized to an operator, regardless of language and/or unique voice patterns of the operator.

This patent claims priority to Indian Patent Application No. IN201621002963, entitled "Voice Interfaces in Process Control Systems," which was filed on Jan. 27, 2016. The foregoing Indian Patent Application is hereby incorporated herein by reference in its entirety.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While the examples disclosed herein are described with regards to process control systems, the examples disclosed herein may be applied to any voice-based security systems and/or verbal authentication/programming systems. While the examples disclosed herein are described in regards to programming and/or setting configuration data, the examples disclosed herein may be also used in accessing data (e.g., accessing data from process control devices).

What is claimed is:

1. A method comprising:
authenticating a portable device based on a unique identifier of an RFID device, the RFID device coupled to the portable device;
based on authenticating the portable device, enabling programming by voice instructions, the voice instructions including settings data for a process control device of a process control system;
receiving the voice instructions;
determining, using a processor, the settings data based on the voice instructions; and
storing the settings data.

2. A method as defined in claim 1, further including authenticating the voice instructions based on a comparison of the voice instructions received to pre-recorded voice samples.

3. A method as defined in claim 2, wherein the pre-recorded voice samples are mapped to one or more of pre-defined configuration settings, parameter values, or strings.

4. A method as defined in claim 2, further including retrieving the pre-recorded voice samples based on the unique identifier of the RFID device.

5. A method as defined in claim 4, wherein the pre-recorded voice samples are stored on the RFID device and to be retrieved by an RFST associated with the process control device.

6. A method as defined in claim 2, wherein each of the voice instructions is authenticated separately.

7. A method as defined in claim 1, wherein the voice instructions are to be received at a microphone disposed in an RFST device associated with the process control system after the portable device has been authenticated.

8. A method as defined in claim 7, wherein the microphone is disposed in the RFID device.

9. A method as defined in claim 1, further including a microphone to receive the voice instructions, the microphone disposed in a terminal of the process control device.

10. A method as defined in claim 1, wherein the RFID device is integral with the portable device.

11. A method comprising:
authenticating, at an RFST of a process control system, a portable device based on a unique identifier of an RFID device coupled to the portable device;
upon authenticating the portable device, enabling reception of a voice statement via a microphone of a terminal or the RFST;
authenticating, via a processor, the voice statement based on a comparison of the voice statement to a pre-recorded voice sample, wherein the pre-recorded voice sample is downloaded at the terminal or the RFST based on the unique identifier of the RFID device; and
upon successfully authenticating the voice statement, enabling a transfer of data between the terminal of the process control system and a portable device.

12. A method as defined in claim 11, wherein the voice statement includes configuration settings instructions, and further including generating configuration settings data based on the configuration settings instructions.

13. A method as defined in claim 11, wherein the pre-recorded voice sample is stored on the RFID device and retrieved from the RFID device by the RFST.

14. A method as defined in claim 11, wherein the voice statement is received at the RFST and authenticated at the terminal.

15. An apparatus comprising:
a configuration programming authentication system for a process control system including:
a microphone;
a processor including a voice analyzer to analyze a voice statement received at the microphone;
an authenticator to authenticate a unique identifier of an RFID device that is coupled to a portable device, the authenticator to cause the voice analyzer to authenticate the voice statement based on the authentication of the unique identifier; and
an RFST to communicate with the portable device to program a process control device of the process control system upon authentication of the voice command.

16. An apparatus as defined in claim 15, wherein the microphone is disposed in a terminal of the process control system.

17. An apparatus as defined in claim 15, wherein the processor is to further enable programming of configuration settings of the process control device via the portable device based on authenticating the voice statement.

18. An apparatus as defined in claim 15, wherein the processor is to further enable programming of configuration settings based on a comparison of the voice statement to pre-recorded voice samples.

19. An apparatus as defined in claim 18, further including a network interface to receive the pre-recorded voice samples therefrom.

20. An apparatus as defined in claim 15, wherein the RFID device is integral with the portable device.

21. An apparatus as defined in claim 15, wherein the microphone is disposed in the RFID device.

22. A method comprising:
detecting a presence of a portable device;
upon detecting the presence of the portable device, authenticating, by an RFST device, a unique RFID identifier of the portable device;
setting a terminal of a process control system to a voice programming mode based on the authentication of the unique identifier of the portable device;

receiving a voice statement, at one or more of the terminal or the RFST device, when the terminal is set to the voice programming mode;

authenticating the voice statement; and upon successfully authenticating the voice statement, analyzing the voice statement to store configuration settings determined from the voice statement.

23. A method as defined in claim 22, further including enabling a data transfer between one or more of the RFST device, the portable device, or the terminal based upon successfully authenticating the voice statement.

24. A method as defined in claim 22, further including, upon successful authentication of the voice statement, analyzing whether the voice statement includes instructions.

* * * * *